US007913803B2

(12) United States Patent
Hidaka (10) Patent No.: US 7,913,803 B2
(45) Date of Patent: Mar. 29, 2011

(54) VEHICULAR STEERING APPARATUS WITH CAPABILITY OF PROVIDING SUITABLE STEERING ANGLE CORRECTION AND POWER ASSISTANCE

(75) Inventor: Kenichiro Hidaka, Aichi-ken (JP)

(73) Assignee: Denso Corporation, Kariya (JP)

( * ) Notice: Subject to any disclaimer, the term of this patent is extended or adjusted under 35 U.S.C. 154(b) by 1003 days.

(21) Appl. No.: 11/257,391

(22) Filed: Oct. 25, 2005

(65) Prior Publication Data

US 2006/0086561 A1    Apr. 27, 2006

(30) Foreign Application Priority Data

Oct. 25, 2004    (JP) .................................. 2004-309687

(51) Int. Cl.
   *B62D 5/04*    (2006.01)
(52) U.S. Cl. ............................ 180/446; 180/443; 701/41
(58) Field of Classification Search .................. 180/446, 180/443; 701/41
   See application file for complete search history.

(56) References Cited

U.S. PATENT DOCUMENTS

| | | | | |
|---|---|---|---|---|
| 5,373,444 | A * | 12/1994 | Takahashi | 701/43 |
| 5,485,378 | A | 1/1996 | Franke et al. | |
| 6,041,884 | A * | 3/2000 | Shimizu et al. | 180/443 |
| 6,144,908 | A * | 11/2000 | Yasuda | 701/41 |
| 6,415,215 | B1 * | 7/2002 | Nishizaki et al. | 701/70 |
| 6,675,096 | B2 * | 1/2004 | Matsuura | 701/301 |
| 6,778,890 | B2 * | 8/2004 | Shimakage et al. | 701/41 |
| 7,016,783 | B2 * | 3/2006 | Hac et al. | 701/301 |
| 7,610,131 | B2 * | 10/2009 | Kojima | 701/38 |
| 2002/0041167 | A1 * | 4/2002 | Kitano et al. | 318/3 |
| 2002/0156581 | A1 * | 10/2002 | Matsuura | 701/301 |
| 2002/0161510 | A1 * | 10/2002 | Matsuura | 701/200 |

FOREIGN PATENT DOCUMENTS

| | | |
|---|---|---|
| EP | 1 291 227 A2 | 3/2003 |
| EP | 1 342 642 A2 | 9/2003 |
| JP | A-05-319289 | 12/1993 |
| JP | 2000-233762 | 8/2000 |
| JP | A-2003-137122 | 5/2003 |

OTHER PUBLICATIONS

Search Report from European Patent Office issued on May 4, 2006 for the corresponding European patent application No. 05023326.1-2425 (a copy thereof).
Office Action dated Jul. 6, 2009 issued from the Japan Patent Office for counterpart application No. 2004-309687 (English translation enclosed).

* cited by examiner

*Primary Examiner* — Joanne Sibermann
*Assistant Examiner* — Maurice Williams
(74) *Attorney, Agent, or Firm* — Posz Law Group, PLC (57) ABSTRACT

A vehicular steering apparatus according to the invention includes a steering angle correction mechanism, a steering power assist mechanism, and a controller. The steering angle correction mechanism works to provide a correction steering angle to a steerable road wheel of a vehicle. The steering power assist mechanism is configured to provide the steerable road wheel of the vehicle with a base assist power and a correction assist power in a first operation mode and the base assist power and a limited correction assist power in a second operation mode. The controller works to control the steering angle correction mechanism to provide the correction steering angle to the steerable road wheel. The controller also works to control the steering power assist mechanism to operate in the first operation mode if the absolute value of the correction steering angle is greater than a predetermined value and in the second operation mode otherwise.

6 Claims, 7 Drawing Sheets

VEHICULAR STEERING APPARATUS WITH CAPABILITY OF PROVIDING SUITABLE STEERING ANGLE CORRECTION AND POWER ASSISTANCE

CROSS-REFERENCE TO RELATED APPLICATION

This application claims priority from Japanese Patent Application No. 2004-309687, filed on Oct. 25, 2004, the content of which is hereby incorporated by reference into this application.

BACKGROUND OF THE INVENTION

1. Technical Field of the Invention

The present invention relates generally to steering apparatuses or systems for vehicles. More particularly, the invention relates to a steering apparatus for a vehicle which is configured to provide suitable steering assistance to the driver of the vehicle so as to improve the turning stability of the vehicle.

2. Description of the Related Art

A conventional steering apparatus for a vehicle is configured to provide a correction steering angle to a steerable road wheel of the vehicle. Specifically, the steering apparatus estimates a cornering force and a slip angle of the steerable road wheel based on the running state of the vehicle and a steering input from the driver of the vehicle. Then, the steering apparatus calculates the partial differential of the cornering force with respect to the slip angle. When the calculated partial differential has a negative value, the steering apparatus provides the correction steering angle, which has a value equal to the difference between the slip angle and a predetermined limit slip angle, to the steerable road wheel.

Such a steering apparatus has recently been developed to include therein a Variable Gear Ratio Steering (VGRS) mechanism that works to vary the ratio between a steering angle of the steerable road wheel and a turning angle of a steering wheel of the vehicle. For example, when the vehicle is running at high speed, the ratio may be made small so as to suppress rapid increase of the steering angle of the steerable road wheel with respect to the turning angle of the steering wheel, thereby securing the turning stability of the vehicle. On the contrary, when the vehicle is running at low speed, the ratio may be made large so as to allow maneuvers of the vehicle that require a large steering angle of the steerable road wheel, such as a parallel parking, to be completed with a small turning angle of the steering wheel.

More specifically, when the turning angle of the steering wheel is made excessively large, the slip angle of the steerable road wheel will accordingly be excessively large. Consequently, the partial differential of the cornering force of the steerable road wheel with respect to the slip angle will have a negative value, in other words, the lateral force of the steerable road wheel will decrease. In such a case, the steering apparatus provides the correction steering angle, which is equal to the difference between the slip angle and the predetermined limit slip angle, to the steerable road wheel. As a result, the actual steering angle of the steerable road wheel is decreased, in other words, the ratio between the steering angle of the steerable road wheel and the turning angle of the steering wheel is decreased, thereby preventing a decrease in the lateral force of the steerable road wheel and securing the turning stability of the vehicle.

However, in the above steering apparatus, since both the cornering force and the slip angle of the steerable road wheel are obtained by estimation, the value of the partial differential of the cornering force with respect to the slip angle will be easily influenced by errors in sensing operating parameters of the vehicle and the turning angle of the steering wheel. Consequently, it is difficult to accurately determine whether the lateral force of the steerable road wheel is to decrease, and thus it is impossible to provide a suitable correction steering angle to the steerable road wheel.

A conventional steering apparatus of another type is configured to detect an actual yaw rate of the vehicle, determine a required yaw rate of the vehicle based on operating parameters of the vehicle, determine a correction steering angle based on the difference between the actual yaw rate and the required yaw rate of the vehicle, and provide the determined correction steering angle to a steerable road wheel of the vehicle.

However, with the above steering apparatus, the actual steering angle of the steerable road wheel may be increased by the correction steering angle in the direction corresponding to the turning direction of a steering wheel of the vehicle, even when the slip angle of the steerable road wheel has already exceeded a limit slip angle. Consequently, the slip angle of the steerable road wheel increases further, and the lateral force of the steerable road wheel accordingly decreases further, thus deteriorating the turning stability of the vehicle.

To provide suitable steering assistance, Japanese Patent First Publication No. 2000-233762 discloses a steering apparatus for a vehicle, which includes a VGRS mechanism to provide a correction steering angle to a steerable road wheel of the vehicle and an Electric Power Steering (EPS) mechanism to provide assistance power to the steerable road wheel of the vehicle.

In the above steering apparatus, the EPS mechanism is employed mainly for providing assistance power so as to reduce the turning effort of the driver of the vehicle. However, control of the EPS mechanism has not integrated well with that of the VGRS mechanism. Consequently, in some cases, the correction steering angle cannot be reliably provided to the steerable road wheel of the vehicle, thus making it impossible to secure the turning stability of the vehicle.

SUMMARY OF THE INVENTION

The present invention has been made in view of the above-mentioned problems.

It is, therefore, a primary object of the present invention to provide a vehicular steering apparatus that can reliably provide a suitable steering angle correction and electric power assistance.

According to the present invention, a vehicular steering apparatus is provided which includes a steering angle correction mechanism, a steering power assist mechanism, and a controller.

The steering angle correction mechanism is configured to provide a correction steering angle to a steerable road wheel of a vehicle so as to vary the ratio between a turning angle of a steering wheel of the vehicle and a steering angle of the steerable road wheel.

The steering power assist mechanism is configured to selectively operate in a first and a second mode. In the first mode, the steering power assist mechanism provides a base assist power and a correction assist power to the steerable road wheel. In the second mode, the steering power assist mechanism provides the base assist power and a limited correction assist power to the steerable road wheel.

The controller works to control the steering angle correction mechanism to provide the correction steering angle to the steerable road wheel. The controller also works to control the steering power assist mechanism to operate in one of the first mode and the second mode depending on if the absolute value of the correction steering angle is greater than a predetermined value.

Specifically, if the absolute value of the correction steering angle is not greater than the predetermined value, the controller works to control the steering power assist mechanism to operate in the first mode. Otherwise, the controller works to control the steering power assist mechanism to operate in the second mode.

With the above arrangement, it is possible for the steering apparatus to reliably provide a suitable steering angle correction and electric power assistance, thereby securing the turning stability of the vehicle.

Moreover, in the above steering apparatus, the limited correction assist power may be set to zero. Otherwise, the limited correction assist power may be determined by limiting the correction assist power based on the correction assist angle.

Further, in the above steering apparatus, the predetermined value, to which the absolute value of the correction steering angle is compared, may be set to zero.

Furthermore, in the above steering apparatus, the controller may also be configured as follows. If the absolute value of the correction steering angle is greater than the predetermined value, the controller further works to compare the direction of the correction assist power with that of the correction steering angle. If the direction of the correction assist power is coincident with that of the correction steering angle, the controller works to control the steering power assist mechanism to operate in the first mode. Otherwise, the controller works to control the steering power assist mechanism to operate in the second mode.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1-11.

It should be noted that, for the sake of clarity and understanding, identical components having identical functions in each of the figures have been marked with the same reference numerals.

Figure 1:
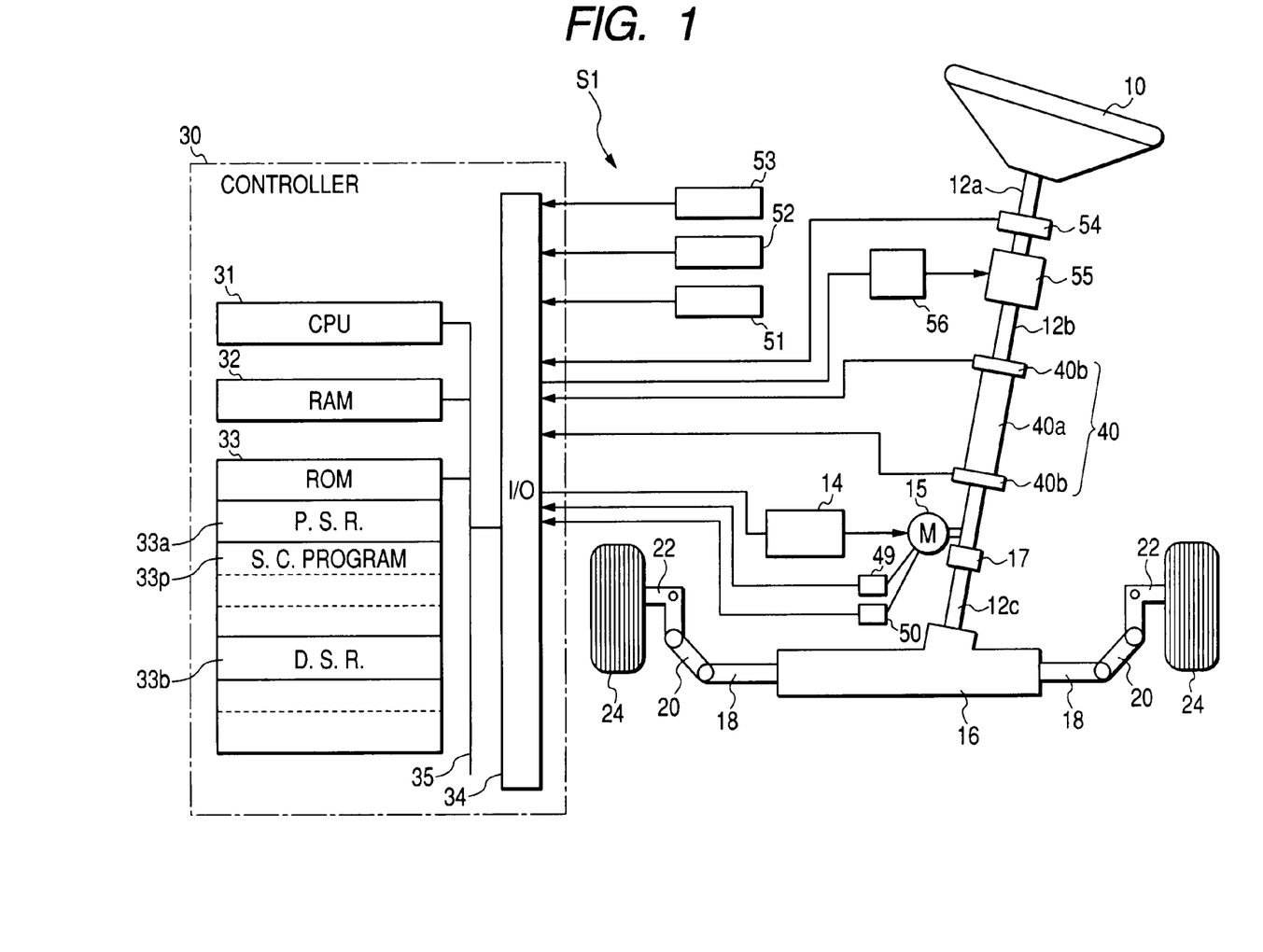
FIG. 1 is a schematic view showing the overall configuration of a vehicular steering apparatus according to an embodiment of the invention.

FIG. 1 shows the overall configuration of a steering apparatus S1 according to an embodiment of the present invention. The steering apparatus S1 is for use in a motor vehicle.

As shown in FIG. 1, a steering wheel 10 is coupled to a steering shaft 12a. To detect a turning angle θh of the steering wheel 10, there is provided a rotation angle sensor 54 on the steering shaft 12a. The rotation angle sensor 54 includes a sensing unit of well-known type, such as a rotary encoder and a resolver. The rotation angle sensor 54 is configured to generate a turning angle signal indicative of the turning angle θh of the steering wheel 10.

A Variable Gear Ratio Steering (VGRS) mechanism 55 is provided, which has one end coupled to the steering shaft 12a and the other end coupled to a steering shaft 12b. The VGRS mechanism 55 includes a motor, a lock mechanism, and a rotation angle sensor, all of which are not explicitly indicated in FIG. 1. The motor works to rotate the steering shaft 12b by a rotation angle θp that is determined based on the turning angle θh of the steering wheel 10 and a correction steering angle θa that is to be described later. The motor may be of any type, for example, a brushless motor. The lock mechanism works to selectively connect or disconnect the steering shafts 12a and 12b. Both the motor and the lock mechanism are driven by a VGRS drive circuit 56. The rotation angle sensor works to sense the rotation angle θp of the steering shaft 12b and generate a rotation angle signal indicative of the sensed rotation angle.

A torque sensor 40 is also provided, which has one end coupled to the steering shaft 12b and the other end linked to a pinion shaft 12c. The torque sensor 40 includes a torsion bar 40a of well-known type and a pair of resolvers 40b that are opposed to each other in the axial direction of the torsion bar 40a. When the steering shaft 12b is rotated by a steering torque Ts, the torsion bar 40a will also receive that steering torque. Then, an angular difference between the two ends of the torsion bar 40a is detected by the resolvers 40b, and the steering torque Ts is determined based on the angular difference and the spring constant of the torsion bar 40a. The torque sensor 40 also works to generate a torque signal indicative of the determined steering torque Ts. It should be noted that other types of torque sensors may also be used instead of the one described hereinabove.

The pinion shaft 12c is coupled to a pinion (not shown) that engages with a rack bar 18 within a steering gear box 16. To each end of the rack bar 18, there is coupled one of two tie rods 20, respectively. Each of the tie rods 20 is further operatively linked to one of two steerable road wheels 24 of the vehicle through a corresponding one of two knuckle arms 22.

An assist motor 15 is operatively linked to the pinion shaft 12c, through a speed reducer 17 that is disposed between the torque sensor 40 and the steering gear box 16 and has a given speed reducing ratio. The assist motor 15 is driven by a motor driver 14 to provide assistant steering power to the steerable road wheels 24 of the vehicle. A rotation angle sensor 49 is provided to sense a rotation angle of the assist motor 15, and an electric current sensor 50 is provided to sense an electric current supplied to the assist motor 15.

The assist motor 15, the speed reducer 17, the motor driver 14, the rotation angle sensor 49, and the electric current sensor 50 together make up an Electric Power Steering (EPS) mechanism of the steering apparatus S1. Additionally, both the assist motor 15 and the speed reducer 17 may also be disposed within the steering gear box 16. Moreover, the assist motor 15 may be of any types applicable to the steering apparatus S1, such as a DC motor and a brushless motor.

A controller 30 is provided, which is configured, for example, with a micro computer of a well-known type. The controller 30 includes a CPU (Central Processing Unit) 31, a RAM (Random Access Memory) 32, a ROM (Read Only Memory) 33, an I/O (Input/Output) 34, and a bus line 35 that connects all the components 31-34. The CPU 31 performs predetermined processes in accordance with a steering control program 33p. The ROM 33 includes a program storage region 33a, in which the steering control program 33p is stored, and a data storage region 33b in which data necessary for implementation of the steering control program 33p are stored.

In addition, a vehicle speed sensor 51, a yaw rate sensor 52, and a lateral acceleration sensor 53 are coupled to the controller 30. The vehicle speed sensor 51, which includes a sensing unit of well-known type such as a rotary encoder, works to sense a traveling speed V of the vehicle. The yaw rate sensor 52, which is configured with an acceleration sensor of well-known type, works to sense a yaw rate γ of the vehicle. The lateral acceleration sensor 53 works to sense a lateral acceleration Gy of the vehicle.

Having described the overall configuration of the steering apparatus S1, operation thereof will be described hereinafter.

First, control of the VGRS mechanism 55 by the controller 30 is described as follows.

The vehicle speed signal, which is generated by the vehicle speed sensor 51 and indicative of the traveling speed V of the vehicle, the turning angle signal, which is generated by the rotation angle sensor 54 and indicative of the tuning angle θh of the steering wheel 10, and the rotation angle signal, which is generated by the rotation angle sensor in the VGRS mechanism 55 and indicative of the rotation angle θp of the steering shaft 12b, are fed to the controller 30.

Then, the controller 30 determines a target rotation angle θpm of the steering shaft 12b by using the equation of θpm=ƒ(θh, θa), where ƒ is a predetermined function. (A determination process of the correction steering angle θa is to be described in detail later.)

Further, the controller 30 calculates the difference e between the target rotation angle θpm and the sensed rotation angle θp of the steering shaft 12b by using the equation of e=θpm−θp.

To make the difference e zero, in other words, to bring the actual rotation angle θp into agreement with the target rotation angle θpm, the controller 30 performs a PID control.

Specifically, the controller 30 determines a drive voltage Vd for driving the motor in the VGRS mechanism 55, using the equation of Vd=C(s)×e, where C(s) is a transfer function in the PID control and s is the Laplace operator. Then, the controller 30 commands the VGRS drive circuit 56 to drive the motor in the VGRS mechanism 55 with the determined drive voltage Vd. As a result, the steering shaft 12b is rotated by the motor, and the actual rotation angle θp is brought into agreement with the target rotation angle θpm.

Consequently, in addition to a steering angle δ that is induced by the turning angle θh of the steering wheel 10, an additional steering angle, i.e., the correction steering angle θa is provided to the steerable road wheels 24 of the vehicle by the VGRS mechanism 55.

Figure 2:
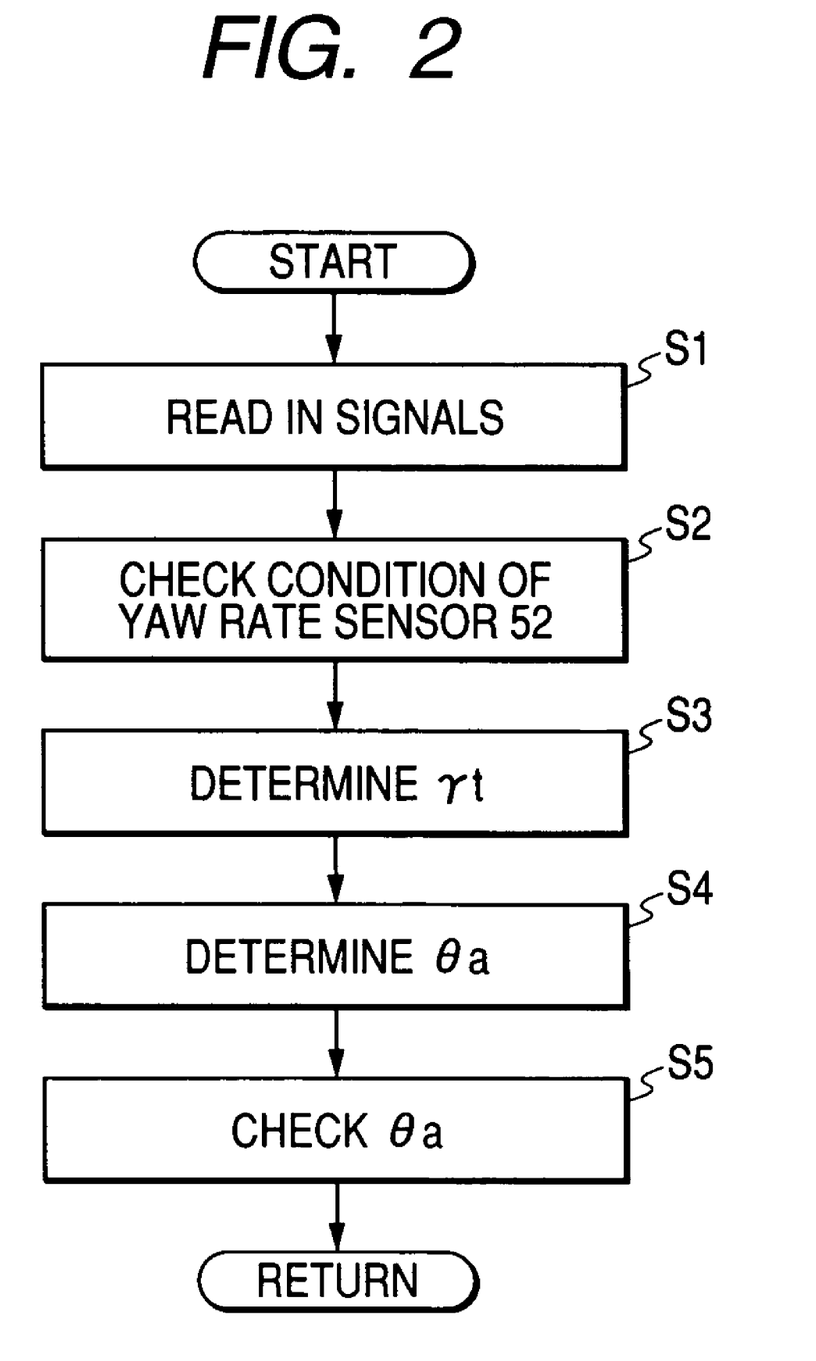
FIG. 2 is a flow chart illustrating the determination process of a correction steering angle in the vehicular steering apparatus of FIG. 1.

Secondly, with reference to FIG. 2, the determination process of the correction steering angle θa by the controller 30 is described as follows.

At step S1, sensing signals, including the turning angle signal that is generated by the turning angle sensor 54 and indicative of the turning angle θh of the steering wheel 10, are fed to the controller 30.

At step S2, the steering angle δ of the steerable road wheels 24, which corresponds to the turning angle θh of the steering wheel 10, is determined based on the turning angle h.

Then, a determination is made as to whether the yaw rate sensor 52 is in a fault condition. If it is, the yaw rate γ sensed by the yaw rate sensor 52 is to be corrected. (The fault condition determination process of the yaw rate sensor 52 is to be described in detail later.)

At step S3, a target yaw rate γt of the vehicle is determined by the following equation:

$$\gamma t = V \times \delta / (1 + Kh \times V^2) H \qquad \text{(Equation 1)},$$

where V is the traveling speed of the vehicle, H is the wheel base of the vehicle, and Kh is a stability factor.

At step S4, a yaw rate difference Δγt between the target yaw rate γt and the sensed yaw rate γ is determined by using the equation of Δγt=γt−γ. Then, using a map that represents the graph of FIG. 5, the correction steering angle θa is determined based on the yaw rate difference Δγt. In addition, instead of using the map, the correction steering angle θa may also be determined as a value proportional to the yaw rate difference Δγt.

At step S5, a determination is made as to whether the absolute value of the correction steering angle θa exceeds a predetermined limit value θm. If it is, the correction steering angle θa is then corrected to have the value of θm.

Figure 3:
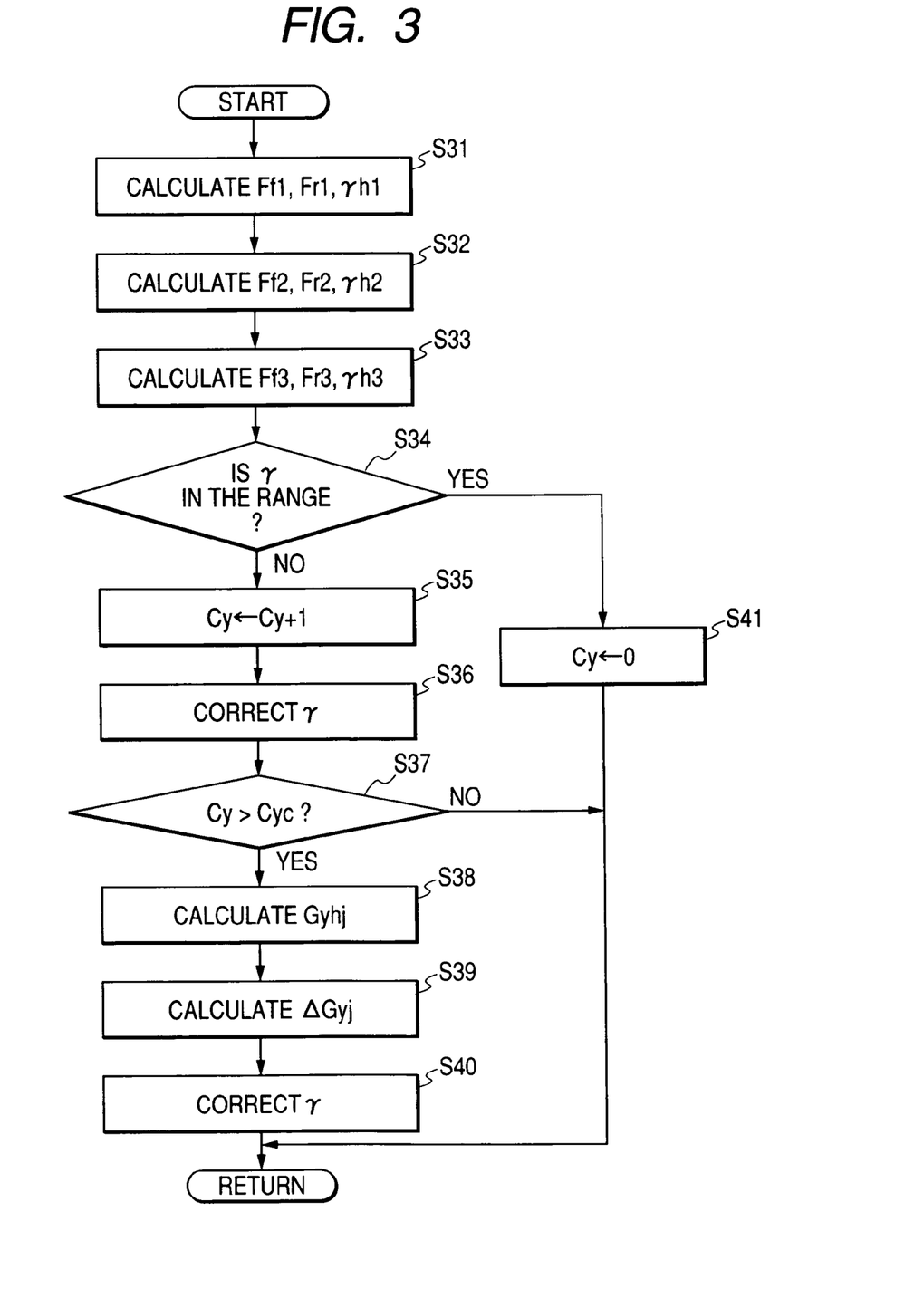
FIG. 3 is a flow chart illustrating the fault condition determination process of a yaw rate sensor in the vehicular steering apparatus of FIG. 1.

Thirdly, with reference to FIG. 3, the fault condition determination process of the yaw rate sensor 52 by the controller 30 is described as follows.

Figure 6:
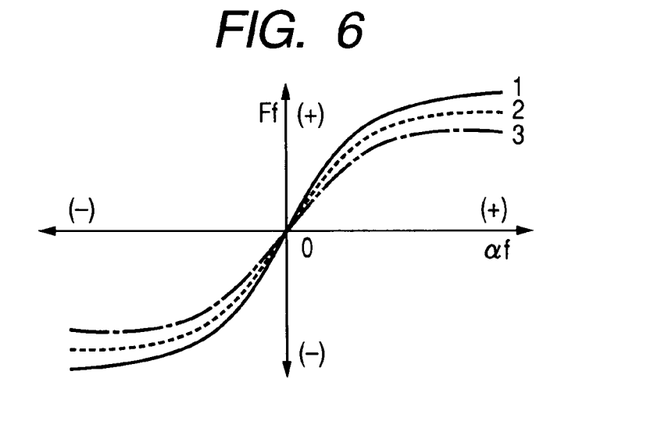
FIG. 6 is a graphical representation showing the relationship between a slip angle and a lateral force of a front wheel of a vehicle.
Figure 7:
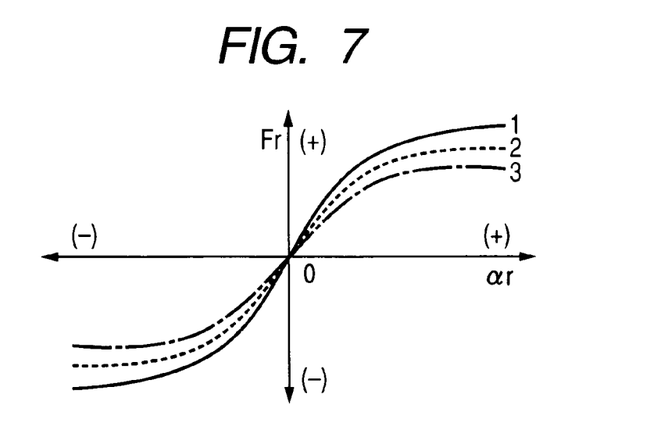
FIG. 7 is a graphical representation showing the relationship between a slip angle and a lateral force of a rear wheel of a vehicle.

At step S31, using the following equations 2-6 and maps that represent the solid lines 1 in FIGS. 6 and 7, a slip angle αf of the front wheels (i.e., the steerable road wheels 24) of the vehicle, a slip angle αr of the rear wheels of the vehicle, a lateral force Ff of the front wheels, a lateral force Fr of the rear wheels, a slip angle β of the vehicle, a yaw rate γh of the vehicle, and a lateral velocity Vy of the vehicle are estimated.

$$\alpha f = (-\beta + \delta) - Lf \times (\gamma h / Vx) \qquad \text{(Equation 2)}$$

$$\alpha r = -\beta + Lr \times (\gamma h / Vx) \qquad \text{(Equation 3)}$$

$$\gamma d = (Lf \times Ff - Lr \times Ff)/Iz \qquad \text{(Equation 4)}$$

$$Vyd = (Ff + Fr)/m - (Vx \times \gamma h)$$ (Equation 5)

$$\beta = Vy/Vx$$ (Equation 6)

In the above equations, Lf is the distance between the center of gravity of the vehicle and the front axle of the vehicle, Lr is the distance between the center of gravity of the vehicle and the rear axle of the vehicle, Vx is a longitudinal velocity of the vehicle (i.e., V), Iz is the yaw moment of inertia of the vehicle, m is the mass of the vehicle, γd is the differential of the yaw rate γ with respect to time, and Vyd is the differential of the lateral velocity Vy of the vehicle with respect to time.

Moreover, among the above equations, the equations 4 and 5 are differential equations and solved by a finite difference method. In addition, all the lines 1, 2, and 3 in FIGS. 6 and 7 are determined based on the model of the vehicle.

The estimated lateral forces Ff and Fr are then set as lateral forces Ff1 and Fr1 of an observer 1, respectively; the estimated yaw rate γh is then set as a yaw rate γh1 of the observer 1.

At step S32, using the above equations 2-6 and maps that represent the dashed lines 2 in FIGS. 6 and 7, a slip angle αf of the front wheels of the vehicle, a slip angle αr of the rear wheels of the vehicle, a lateral force Ff of the front wheels, a lateral force Fr of the rear wheels, a slip angle β of the vehicle, a yaw rate γh of the vehicle, and a lateral velocity Vy of the vehicle are estimated.

The estimated lateral forces Ff and Fr are then set as lateral forces Ff2 and Fr2 of an observer 2, respectively; the estimated yaw rate γh is then set as a yaw rate γh2 of the observer 2.

At step S33, using the equations 2-6 and maps that represent the chained lines 3 in FIGS. 6 and 7, a slip angle αf of the front wheels of the vehicle, a slip angle αr of the rear wheels of the vehicle, a lateral force Ff of the front wheels, a lateral force Fr of the rear wheels, a slip angle β of the vehicle, a yaw rate γh of the vehicle, and a lateral velocity Vy of the vehicle are estimated.

The estimated lateral forces Ff and Fr are then set as lateral forces Ff3 and Fr3 of an observer 3, respectively; the estimated yaw rate γh is then set as a yaw rate γh3 of the observer 3.

At step S34, among the yaw rates γhj (j=1, 2, 3) of the observers 1-3, the maximum one is set as γhmax and the minimum one is set as γhmin.

Then, a determination is made as to whether the sensed yaw rate γ falls in the range between (γhmin−γc) and (γhmax+γc), where γc is a positive constant.

If it is, the process proceeds to step S41, at which a counting number Cy of a fault condition determination counter is reset to zero. Otherwise, the process proceeds to step S35, at which the counting number Cy is increased by 1.

At step S36, the sensed yaw rate γ is corrected to (γhmax+γc) when it is above (γhmax+γc) and to (γhmin−γc) when it is below (γhmin−γc).

At step S37, a determination is made as to whether the counting number Cy of the fault condition determination counter exceeds a reference value Cyc (a positive integer), in other words, as to whether the time period during which the sensed yaw rate γ falls out of the range becomes longer than a given time period.

If it is not, the process goes to end. Otherwise, the process proceeds to step S38.

At step S38, based on the lateral forces Ffj and Frj (j=1, 2, 3) of the vehicle, lateral accelerations Gyhj (j=1, 2, 3) of the vehicle are estimated by the following equation:

$$Gyhj = (Ffj + Frj)/m$$ (Equation 7)

At step S39, lateral acceleration differences ΔGyj (j=1, 2, 3) between the lateral acceleration Gy of the vehicle that is sensed by the lateral acceleration sensor 53 and the estimated Gyhj are determined by the following equation:

$$\Delta Gyj = Gy - Gyhj$$ (Equation 8)

At step S40, among the lateral acceleration differences ΔGyj, the one that has the minimum absolute value is identified; among the yaw rates γhj (j=1, 2, 3) of the observers 1-3, the one that corresponds to the identified lateral acceleration difference is accordingly identified. Then, the sensed yaw rate γ of the vehicle is corrected to have the value of the identified yaw rate.

Fourthly, control of the EPS mechanism by the controller 30 is described as follows.

Using a current map stored in the data storage region 33b, the controller 30 determines a drive current based on an assist torque Tas and the electric current sensed by the electric current sensor 50. (A determination process of Tas is to be described in detail later.) Further, using a current-voltage map stored in the data storage region 33b, the controller 30 determines a drive voltage based on the determined drive current. Then, the controller 30 commands the motor driver 14 to drive the assist motor 15 with the determined drive voltage. As a result, the pinion shaft 12c is rotated together with the assist motor 15.

The controller 30 further determines an actual torque generated by the assist motor 15 based on the rotation angle sensed by the rotation angle sensor 49 and the electric current sensed by the electric current sensor 50.

The controller 30 then performs a feedback control so as to bring the actual torque generated by the assist motor 15 into agreement with the assist torque Tas.

As a result, the assist torque Tas is generated by the assist motor 15, and a total steering torque of (Ts+Tas) is provided to the steerable road wheels 24 of the vehicle.

Figure 4:
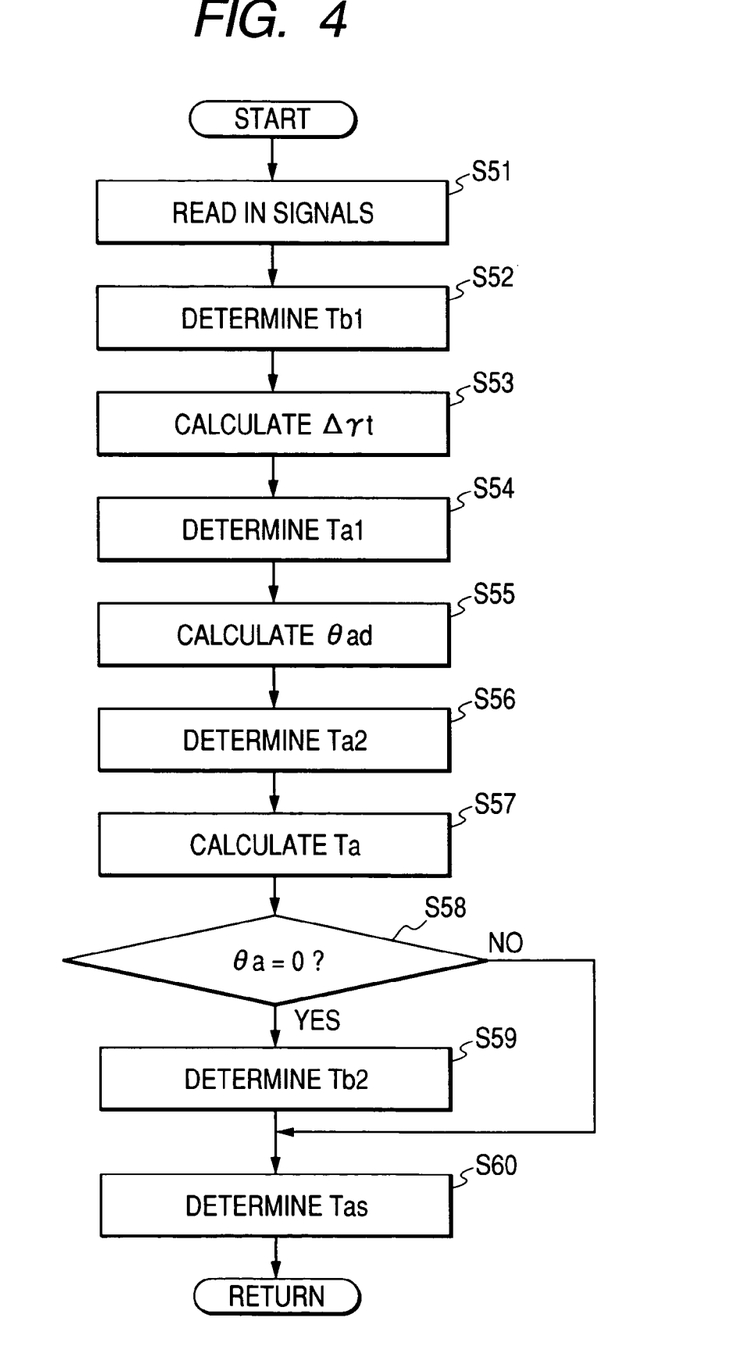
FIG. 4 is a flow chart illustrating the determination process of a total assist torque to be provided by an EPS mechanism in the vehicular steering apparatus of FIG. 1.
Figure 5:
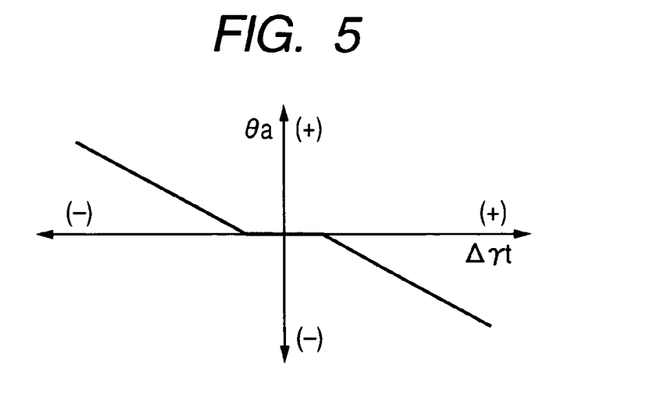
FIG. 5 is a graphical representation showing the relationship between a yaw rate difference and the correction steering angle in the vehicular steering apparatus of FIG. 1.

Fifthly, with reference to FIG. 4, the determination process of the assist torque Tas by the controller 30 is described as follows.

At step S51, sensing signals, including the torque signal that is generated by the torque sensor 40 and indicative of the steering torque Ts applied to the steering shaft 12b, are fed to the controller 30.

Figure 8:
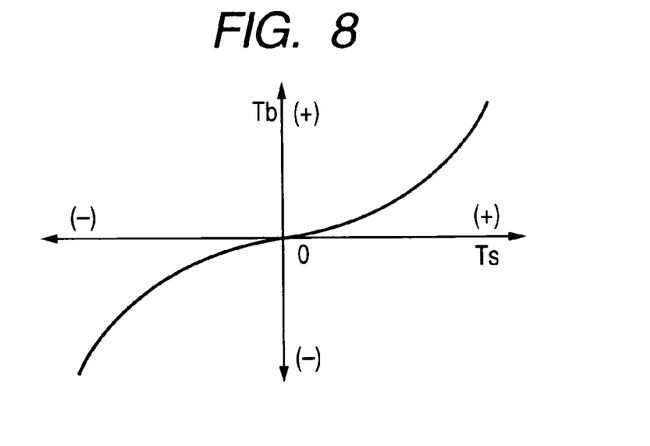
FIG. 8 is a graphical representation showing the relationship between an input torque and a fundamental assist torque of the EPS mechanism in the vehicular steering apparatus of FIG. 1.

At step S52, using a map that represents the graph of FIG. 8, a fundamental assist torque Tb1 is determined based on the steering torque Ts.

At step S53, the yaw rate difference Δγt between the target yaw rate γt and the yaw rate γ sensed by the yaw rate sensor 52 is determined as described previously.

Figure 9:
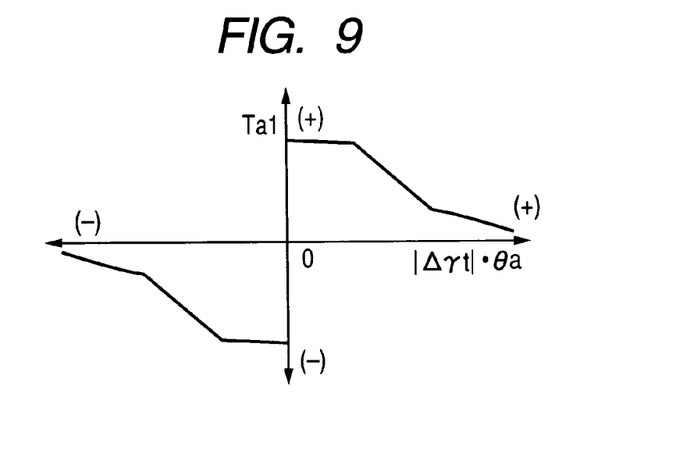
FIG. 9 is a graphical representation showing the relationship between a first correction torque and the product of the absolute value of the yaw rate difference and the correction steering angle in the vehicular steering apparatus of FIG. 1.
Figure 10:
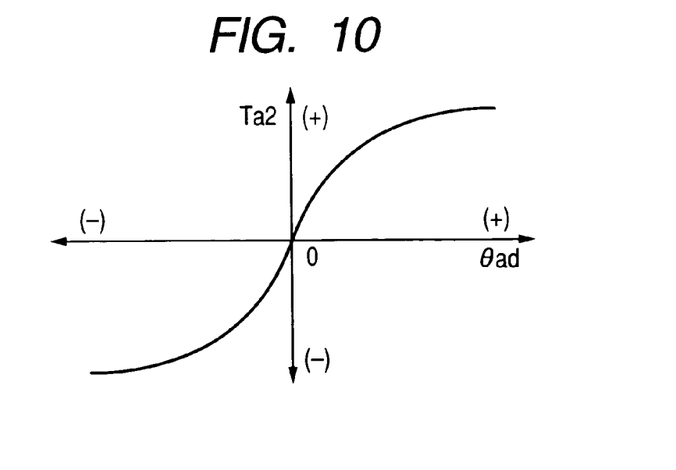
FIG. 10 is a graphical representation showing the relationship between the differential of the correction steering angle with respect to time and a second correction torque in the vehicular steering apparatus of FIG. 1.

At step S54, using a map that represents the graph of FIG. 9, a first correction torque Ta1, which is necessary for providing the correction steering angle θa to the steerable road wheels 24 of the vehicle, is determined based on the product of the absolute value of the yaw rate difference Δγt and the correction steering angle θa.

At step S55, the differential θad of the correction steering angle θa with respect to time is calculated. At step S56, using a map that represents the graph of FIG. 10, a second correction torque Ta2, which is also necessary for providing the correction steering angle θa to the steerable road wheels 24 of the vehicle, is determined based on the differential θad of the correction steering angle θa with respect to time.

At step S57, based on the correction torques Ta1 and Ta2, a correction torque Ta is determined by the following equation:

$$Ta = Ta1 + Ta2$$ (Equation 9)

At step S58, a determination is made as to whether the correction steering angle θa is equal to zero.

If it is, the process proceeds to step S59, at which a correction assist torque Tb2 is determined. (The details about the correction assist torque Tb2 is to be described later.) Otherwise, the process directly proceeds to step S60, so that the correction assist torque Tb2 has a default value of zero.

At step S60, based on the fundamental assist torque Tb1, the correction torque Ta, and the correction assist torque Tb2, the assist torque Tas is determined by the following equation:

$$Tas = Tb1 + Ta + Tb1 \quad \text{(Equation 10)}$$

Figure 11:
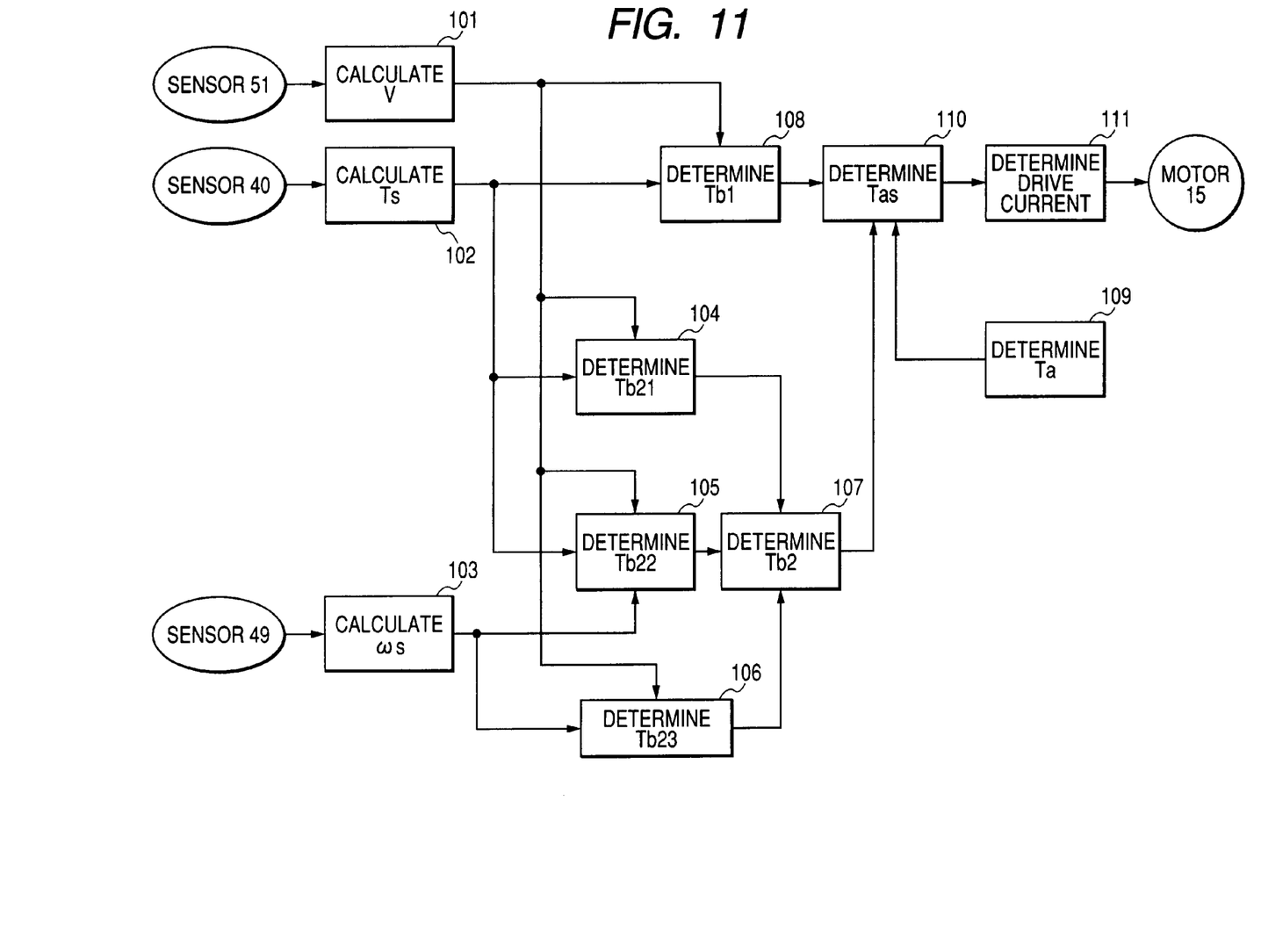
FIG. 11 is a block diagram illustrating control of the EPS mechanism in the vehicular steering apparatus of FIG. 1.

The above-described control of the EPS mechanism and determination process of the assist torque Tas may be understood more fully from FIG. 11.

The traveling speed V of the vehicle is determined based on the vehicle speed signal from the vehicle speed sensor 51, as indicated in block 101. The steering torque Ts applied to the steering shaft 12b is determined based on the torque signal from the torque sensor 40, as indicated in block 102. A steering angular rate $\omega s$ is determined based on the rotation angle signal from the rotation angle sensor 49, as indicated in block 103.

The fundamental assist torque Tb1 is determined based on the steering torque Ts, as indicated in block 108. The correction torque Ta is determined, as indicated in block 109.

Further, a first correction assist torque Tb21 is determined, as indicated in block 104. The first correction assist torque Tb21 is provided by correcting the electric current supply to the assist motor 15 in response to the input torque of the assist motor 15 (i.e., the steering torque Ts), so as to suppress fluctuation in the total steering torque provided to the steerable road wheels 24 of the vehicle (i.e., Ts+Tas).

A second correction assist torque Tb22 is determined, as indicated in block 105. The second correction assist torque Tb22 is provided when the vehicle is running at high speed, by correcting the electric current supply to the assist motor 15 in the direction of hindering rotation of the steering wheel 10, so as to stabilize behavior of the steering wheel 10.

A third correction assist torque Tb23 is determined, as indicated in block 106. The third correction assist torque Tb23 is provided when the vehicle is running at low speed, by correcting the electric current supply to the assist motor 15 in the direction of hindering rotation of the steering wheel 10, so as to facilitate return of the steering wheel 10.

The correction assist torque Tb2 is then determined as the sum of the first, second, third correction assist torques Tb21, Tb22, and Tb23, as indicated in block 107.

The assist torque Tas is determined as the sum of the fundamental assist torque Tb1, the correction torque Ta, and the correction assist torque Tb2, as indicated in block 110.

The drive current for driving the assist motor 15 is determined based on the assist torque Tas and the electric current sensed by the electric current sensor 50, as indicated in block 111.

To sum up, the steering apparatus S1 according to the present embodiment includes the VGRS mechanism 55, the EPS mechanism, which is made up of the assist motor 15, the speed reducer 17, the motor driver 14, the rotation angle sensor 49, and the electric current sensor 50, and the controller 30.

The VGRS mechanism 55 is configured to provide the correction steering angle θa to the steerable road wheels 24 of the vehicle, so as to improve the turning stability of the vehicle.

The EPS mechanism is configured to selectively operate in a first mode and a second mode. In the first mode, the EPS mechanism provides both a base assist torque, which is the sum of the fundamental assist torque Tb1 and the correction torque Ta, and the correction assist torque Tb2 to the steerable road wheels 24 of the vehicle. In the second mode, the EPS mechanism provides only the base assist torque to the steerable road wheels 24 of the vehicle.

The controller 30 works to control the EPS mechanism to operate in one of the first mode and the second mode depending on if the correction steering angle θa is greater than zero.

If the correction steering angle θa is equal to zero, in other words, there is no need to improve the tuning stability of the vehicle, the controller 30 controls the EPS mechanism to operate in the first mode. Consequently, in addition to the base assist torque, the correction assist torque Tb2 is provided to the steerable road wheels 24 of the vehicle, so that fluctuation in the total steering torque (i.e., Ts+Tas) provided to the steerable road wheels 24 is suppressed, and the stability and easiness of handling of the steering wheel 10 of the vehicle is improved.

Otherwise, the controller 30 controls the EPS mechanism to operate in the second mode, in which only the base assist torque is provided to the steerable road wheels 24 of the vehicle, so as to allow the correction steering angle θa to be reliably provided to the steerable road wheels 24 of the vehicle.

Consequently, the steering apparatus S1 can provide the most suitable steering assist to the driver of the vehicle based on the running state of the vehicle and input from the driver (i.e., the turning angle θa of the steering wheel 10).

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, the controller 30 is configured to control the EPS mechanism to operate in one of the first mode and second mode depending on if the correction steering angle θa is greater than zero.

However, the controller 30 may also be configured to control the EPS mechanism to operate in one of the first mode and second mode depending on if the absolute value of the correction steering angle θa is greater than a predetermined value.

Moreover, in the previous embodiment; the EPS mechanism is configured to provide only the base assist torque in the second mode.

However, the EPS mechanism may also be configured to provide, in addition to the base assist torque, a limited correction assist torque in the second mode. The limited correction assist torque may be determined by limiting the correction assist torque Tb2 based on the correction steering angle θa.

Furthermore, in the previous embodiment, the controller 30 is configured to control the EPS mechanism to operate in the second mode if the correction steering angle θa is not equal to zero.

However, the controller 30 may also be configured as follows. If the correction steering angle θa is not equal to zero, the controller 30 further determines if the direction of the correction assist torque Tb2 coincides with that of the correction steering angle θa. If it is, the controller 30 controls the EPS mechanism to operate in the first mode. Otherwise, the controller 30 controls the EPS mechanism to operate in the second mode.

Such modifications, changes, and improvements within the skill of the art are intended to be covered by the appended claims.

What is claimed is:

1. A steering apparatus for a vehicle, comprising:
    a steering angle correction mechanism configured to provide a correction steering angle to a steerable road wheel of a vehicle so as to vary a ratio between a turning angle of a steering wheel of said vehicle and a steering angle of said steerable road wheel;
    a steering power assist mechanism configured to selectively operate in a first and a second mode, wherein, in said first mode, said steering power assist mechanism provides a base assist power and a correction assist power to said steerable road wheel, and in said second mode, said steering power assist mechanism provides said base assist power and a limited correction assist power to said steerable road wheel; and
    a controller that
    controls said steering angle correction mechanism to provide said correction steering angle to said steerable road wheel, and
    controls said steering power assist mechanism to operate in one of said first mode and said second mode depending on an absolute value of said correction steering angle so that
    if said absolute value of said correction steering angle is not greater than a predetermined value, said controller controls said steering power assist mechanism to operate in said first mode, and
    if said absolute value of said correction steering angle is greater than said predetermined value, said controller controls said steering power assist mechanism to operate in said second mode,
    wherein said predetermined value, to which said absolute value of said correction steering angle is compared, is set to zero.

2. The steering apparatus as set forth in claim 1, wherein said limited correction assist power is set to zero.

3. The steering apparatus as set forth in claim 1, wherein said steerable road wheel is a front wheel of said vehicle.

4. A steering apparatus for a vehicle, comprising:
    a steering angle correction mechanism configured to provide a correction steering angle to a steerable road wheel of a vehicle so as to vary a ratio between a turning angle of a steering wheel of said vehicle and a steering angle of said steerable road wheel, said steering angle correction mechanism is configured to rotate a first shaft, which is mechanically linked to said steerable road wheel of said vehicle, so as to provide said correction steering angle to said steerable road wheel;
    a steering power assist mechanism configured to selectively operate in a first and a second mode, wherein, in said first mode, said steering power assist mechanism provides a base assist power and a correction assist power to said steerable road wheel, and in said second mode, said steering power assist mechanism provides said base assist power and a limited correction assist power to said steerable road wheel, said steering power assist mechanism is configured to rotate a second shaft, which is mechanically linked between said first shaft and said steerable road wheel, so as to provide said steerable road wheel with both said base assist power and said correction assist power in said first mode and with both said base assist power and said limited correction assist power in said second mode; and
    a controller that
    controls said steering angle correction mechanism to provide said correction steering angle to said steerable road wheel, and
    controls said steering power assist mechanism to operate in one of said first mode and said second mode depending on an absolute value of said correction steering angle so that
    if said absolute value of said correction steering angle is not greater than a predetermined value, said controller controls said steering power assist mechanism to operate in said first mode, and
    if said absolute value of said correction steering angle is greater than said predetermined value, said controller controls said steering power assist mechanism to operate in said second mode.

5. The steering apparatus as set forth in claim 4, wherein said limited correction assist power is set to zero.

6. The steering apparatus as set forth in claim 4, wherein said steerable road wheel is a front wheel of said vehicle.

* * * * *